United States Patent
Böhm et al.

(10) Patent No.: US 9,948,154 B2
(45) Date of Patent: Apr. 17, 2018

(54) ELECTRONICALLY COMMUTATED DC MOTOR, IN PARTICULAR FOR AN OIL PUMP

(71) Applicants: Bühler Motor GmbH, Nürnberg (DE); MELECS EWS GmbH & Co. KG, Siegendorf (AT); Swoboda KG, Wiggensbach (DE)

(72) Inventors: Ralph Böhm, Bodman-Ludwigshafen (DE); Georg Bernreuther, Nürnberg (DE); Olaf Richter, Stein (DE); Andreas Wall, Nürnberg (DE); Leopold Hellinger, Ziersdorf (AT); Gerhard Neumann, St. Margarethen (AT); Armin Koch, Feldkirch (AT); Peter Woschni, Buchenberg (DE)

(73) Assignees: Buhler Motor GmbH, Numberg (DE); MELECS EWS GmbH & Co. KG, Siegendorf (AT); Swoboda KG, Wiggensbach (DE)

( * ) Notice: Subject to any disclaimer, the term of this patent is extended or adjusted under 35 U.S.C. 154(b) by 374 days.

(21) Appl. No.: 14/873,972

(22) Filed: Oct. 2, 2015

(65) Prior Publication Data

US 2016/0099623 A1    Apr. 7, 2016

(30) Foreign Application Priority Data

Oct. 6, 2014   (DE) .................. 10 2014 220 201

(51) Int. Cl.
*H02K 3/28*   (2006.01)
*H02K 5/02*   (2006.01)
(Continued)

(52) U.S. Cl.
CPC ............... *H02K 3/28* (2013.01); *H02K 3/522* (2013.01); *H02K 5/02* (2013.01); *H02K 9/19* (2013.01);
(Continued)

(58) Field of Classification Search
CPC .. H02K 3/28; H02K 3/46; H02K 3/50; H02K 3/52; H02K 3/521
(Continued)

(56) References Cited

U.S. PATENT DOCUMENTS 5,304,883 A * 4/1994 Denk ...................... H02K 1/12
                                                              174/DIG. 19
2001/0033800 A1   10/2001 Junji et al.
(Continued)

FOREIGN PATENT DOCUMENTS

DE        69804745        11/2002
DE        69917138         5/2005
(Continued)

OTHER PUBLICATIONS

European Search Report for application No. EP 15187775 dated Jun. 21, 2016.

*Primary Examiner* — Jeremy Luks
(74) *Attorney, Agent, or Firm* — Workman Nydegger

(57) ABSTRACT

An electronically commutated DC motor has a stator wound with a multi-phase stator winding, a permanent magnet rotor mounted rotatably about a motor axis, a circuit board, a guide plate electrically connected to the winding and a housing component. In one implementation, a DC motor can easily be manufactured with the fewest possible process steps, which exhibits a short axial length and a low weight as well as good heat-dissipation properties. It is also an object of the invention to create a DC motor with integrated electronics, whose motor interior can be filled with oil, and which holds the electronics sealed against this oil. For
(Continued)

reasons of logistics, an attempt is also made for partial components, such as the electronics, to be designed such that they are capable of complete prior assembly and testing.

33 Claims, 4 Drawing Sheets

(51) Int. Cl.
    *H02K 9/19*     (2006.01)
    *H02K 9/22*     (2006.01)
    *H02K 11/00*     (2016.01)
    *H02K 15/14*     (2006.01)
    *H02K 3/52*     (2006.01)

(52) U.S. Cl.
    CPC ........... *H02K 9/22* (2013.01); *H02K 11/0068* (2013.01); *H02K 15/14* (2013.01)

(58) Field of Classification Search
    USPC .......................................................... 310/71
    See application file for complete search history.

(56) References Cited

U.S. PATENT DOCUMENTS

| | | | | |
|---|---|---|---|---|
| 2002/0180299 | A1* | 12/2002 | Oohashi | H02K 3/28 310/184 |
| 2007/0286723 | A1 | 12/2007 | Ihle et al. | |
| 2009/0189473 | A1* | 7/2009 | Castle | H02K 1/04 310/186 |
| 2010/0019592 | A1* | 1/2010 | Altindis | H02K 3/522 310/71 |
| 2010/0118503 | A1 | 5/2010 | Helmut | |
| 2011/0037331 | A1 | 2/2011 | Jang | |
| 2011/0050138 | A1* | 3/2011 | Li | H02K 3/28 318/400.27 |
| 2011/0115316 | A1 | 5/2011 | Isogai | |
| 2011/0241460 | A1* | 10/2011 | Mebarki | H02K 1/20 310/64 |
| 2013/0043742 | A1 | 2/2013 | Jang | |
| 2014/0015357 | A1* | 1/2014 | Randolph | H01R 4/185 310/71 |
| 2015/0249375 | A1* | 9/2015 | Andrieux | H02K 29/08 310/43 |

FOREIGN PATENT DOCUMENTS

| | | |
|---|---|---|
| DE | 102009049737 | 4/2011 |
| DE | 102012109863 | 4/2013 |
| DE | 102012204241 | 9/2013 |
| EP | 1993191 | 11/2008 |
| WO | 2013037453 | 3/2013 |

* cited by examiner

ELECTRONICALLY COMMUTATED DC MOTOR, IN PARTICULAR FOR AN OIL PUMP

CROSS-REFERENCE TO RELATED APPLICATIONS

The present invention claims the benefit of priority to German Patent Application No. 10 2014 220 201.9 filed Oct. 6, 2014 entitled "Electronically commutated DC motor, in particular for an oil pump," the entire content of which is incorporated herein by reference.

BACKGROUND

The Field of the Invention

The invention relates to an electronically commutated DC motor (1) with a stator (4) wound with a multi-phase stator winding (3), a permanent magnet rotor (5) mounted rotatably about a motor axis (2), a circuit board (6), a guide plate (7) electrically connected to the winding (3) and a housing component (8).

BRIEF SUMMARY OF THE INVENTION

One or more objects of the invention provide a DC motor that can easily be manufactured with the fewest possible process steps, which exhibits a short axial length and a low weight as well as good heat-dissipation properties. It is at least one object of the invention to create a DC motor with integrated electronics, whose interior motor compartment can be filled with oil, and which holds the electronics sealed against this oil. For reasons of logistics, an attempt is also made for partial components, such as the electronics, to be designed such that they are capable of complete prior assembly and testing.

These and other objects can be achieved according to the invention by the features as recited in the claims. The wiring is not made in the stator region, but in the electronics, whereby the length is significantly reduced and the possible applications of the DC motor are extended. The press-fit contacts allow the circuit board to be contacted easily, in a reliable process without using solder, and they also simplify the possibility of prior assembly and testing. The circuit board is protected from the negative effects of the oil filling by the oil-tight injection or casting of a central part of the guide plate.

Developments of the invention are presented in the dependent claims. Due to the heat removal through the cooling plate and the mounting bosses, the heat can be drawn away to a connected aggregate. It is therefore possible to omit a large-area heat sink outside the DC motor. Preferably the cooling plate is tightly pressed onto a substrate by fastening screws, which markedly improves the heat transfer.

The heat dissipation from the circuit board to the cooling plate can be improved through elastic means. Preferably this is arranged on a housing cover which seals the electronic housing to the outside. It has been found that rubber-like materials such as silicone are particularly suitable for this function. It is furthermore proposed that the heat dissipation from power components be passed via thermal vias in the circuit board to the cooling plate, wherein these are insulated or at ground potential. The interacting surfaces should be as clean and smooth as possible for optimum heat transfer.

It is particularly advantageous for the housing component to be formed as a bearing plate in which a sliding bearing or, preferably, a roller bearing, is mounted after assembly. This reduces the number of parts in comparison with conventional DC motors. The housing can thus be economically manufactured entirely of plastic. A significantly simplified manufacturing process for assembly of the circuit board results, without means of fastening such as screws. Pretensioning is also not necessary.

The guide plate can comprise a plurality of insulation displacement contacts for contacting a plurality of coils of one phase. A metal bridge makes the insulation displacement contacts into one piece. It is proposed that the metal bridge is injected or cast into the housing component. Alternatively, the circuit board can also take over the function of this metal bridge.

For technical reasons associated with the circuitry, a plurality of guide plates, insulated from one another, are usually provided. Contoured regions can be helpful here when metal bridges cross over one another. One guide plate is provided as a neutral point terminal for star-connected circuits.

If the values of the currents to be transferred are greater, the insulation displacement contact can helpfully also be implemented as a double contact, for example in the form of sheet metal tongues bent into a U-shape.

In one particularly preferred embodiment of the invention, connecting contacts are injected or cast into the housing component, extending at one end outwards outside the housing component and at the other end forming press-fit contacts that are aligned parallel to the press-fit contacts and are arranged in the same plane. The connecting contacts are hereby also embedded and sealed from the oil, and a connection with the circuit board is possible in one working pass along with the contacting of the press-fit contacts of the guide plates.

In cases where the requirements for oil sealing are greater, it is provided that the housing component is formed from an injection-mouldable thermosetting material, as it has been found that the connecting region between the plastic material and the guide plate can in this way be fabricated with a particularly good seal. The housing component comprises a plurality of functions; it serves as the bearing plate of the motor, as an oil-tight electronic housing, and as a separator between the wet region (DC motor) and the dry region (electronics/circuit board), wherein an oil-tight contact feedthrough is implemented. This solution is more economical and has lower weight than, for example, the use of an aluminum flange. The complexity of assembly is also significantly reduced.

According to a development of the invention, it is proposed that the circuit board (6) is embedded into a sealing material. This provides particularly good protection of the circuit board against the ingress of oil and against other environmental influences.

Advantageously, the circuit board should be embedded in the thermosetting material of the housing component, in order to minimize the process steps and the number of parts.

It is proposed that contact elements of a connecting plug are injected, cast or pressed into the housing cover that closes the dry region—this allows the housing cover to be mounted on the housing component easily and securely. Both parts of the housing preferably consist of the same material, or at least of the same base material, e.g. of thermosetting plastic material.

In order to secure the electronics adequately for transport, it is sufficient to connect the housing cover to the housing component with snap-fastening elements; in this case the use of a thermosetting plastic material for the means of snap-fastening would be more suitable.

The object of the invention is achieved through the following process steps: a) provision of the previously fabricated housing component with injected guide plates and cooling plates, a populated circuit board, a cover seal and a housing cover; b) pressing the circuit board into the press-fit contacts of the housing component; c) mounting the housing cover provided with the cover seal onto the housing component, whereby the circuit board is electrically contacted with the connecting contacts thereby fabricating an electronic module; d) testing the electronic module; e) providing a roller bearing and a pre-assembled DC motor; f) mounting the roller bearing onto the housing component; mounting the electronic module onto the prefabricated DC motor and thereby contacting the winding wire of the stator winding.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
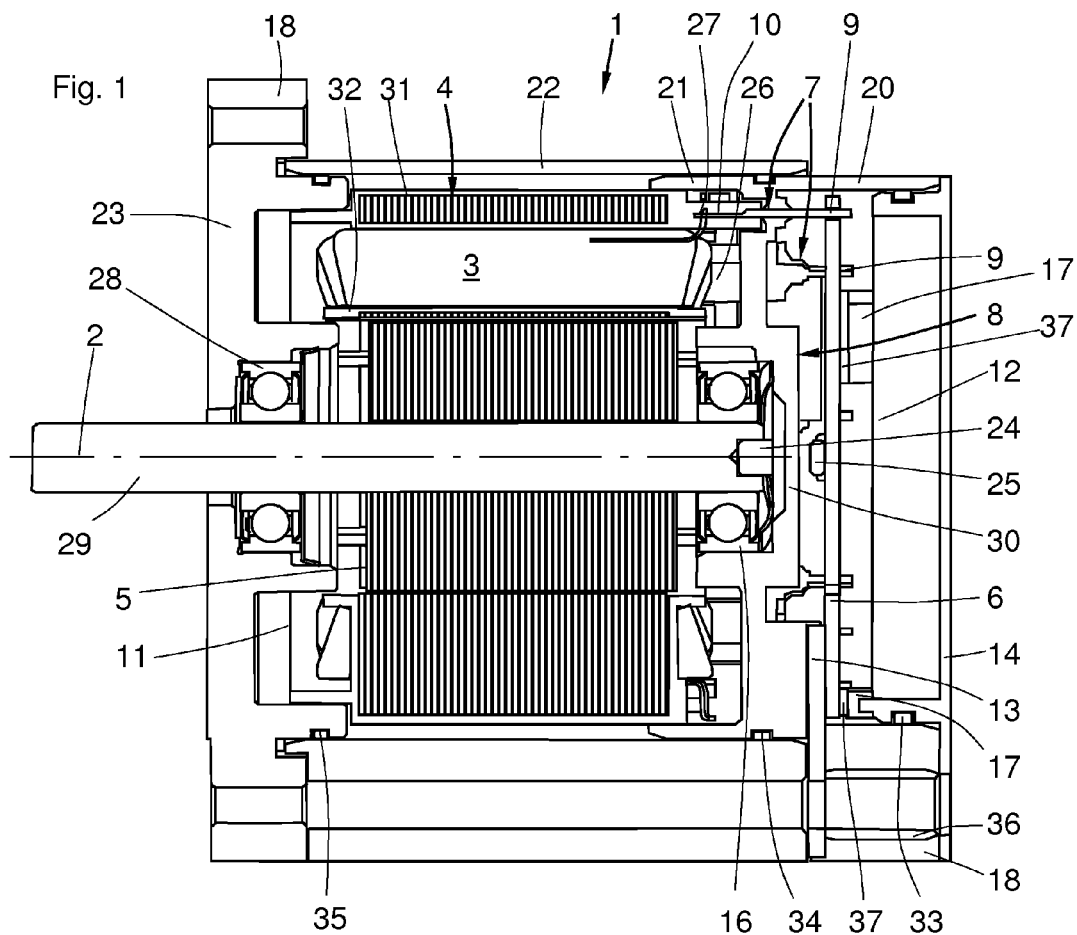
FIG. 1 shows a sectional view through a DC motor.

Note: Reference signs with an apostrophe and corresponding reference signs without an apostrophe indicate single units with the same name in the drawings and the description of the drawings. This involves use in a different embodiment, the prior art, and/or the individual unit is a variant. For the sake of simplicity, the claims, the introduction to the description, the list of reference signs and the abstract only contain reference signs without apostrophe.

DETAILED DESCRIPTION OF THE PREFERRED EMBODIMENTS

FIG. 1 shows a sectional view through an electronically commutated DC motor 1, with a bearing plate 23, a first bearing 28, a housing component 8 which also has the function of a bearing plate, with a roller bearing 16. A shaft 29 is carried as a component of a permanent magnet rotor 5 rotatably in the bearing 28 and in the roller bearing 16. At one end, the shaft is joined to a transducer magnet 24 that operates together with a magnetic sensor 25. The transducer magnet 24 and the magnetic sensor 25 are separated from one another by a wall 30 of the housing component 8. The magnetic sensor 25 is a component of a circuit board 6 which is held in a dry, oil-proof electronics compartment 12.

The electronics compartment 12 is here confined by a housing cover 14, by the wall 30 and by a hollow, cylindrical electronic housing section 20 of the housing component 8, and is sealed by a cover seal 33. A motor compartment 11 is formed by a motor housing 22, the bearing plate 23 and the housing component 8, and is sealed by a housing seal 34 and by a bearing plate seal 35. The cover seal 33, the housing seal 34 and the bearing plate seal 35 are here formed as O-rings. The permanent magnet rotor 5 acts together with a stator 4 which consists of a stator sheet package 31, a stator insulation 32 and a stator winding 3.

Winding wires 27 are connected to insulation displacement contacts 10 of a guide plate 7. A plurality of guide plates 7 are embedded in an oil tight manner into the housing component 8, wherein the housing component 8 consists of a thermosetting material. In the electronics compartment 12, the guide plates 7 are formed as press-fit contacts, and are pressed into the circuit board 6. Large-area sections of conductive tracks of the circuit board 6 are in thermally conductive contact with cooling plates 13, which are also partially embedded in the housing component 8. Elastic means 17, e.g. a rubber component, are arranged in the housing cover 14, and each press on a power component 37, thus pressing the circuit board 6 against the cooling plate 13.

The cooling plates 13 emerge in the region of mounting bosses 18 from the housing component 8, and are matched to the form of the mounting bosses 18 and form a support surface against a heat sink, e.g. a cast housing in the motor vehicle engine compartment. The power components 37 are arranged on the circuit board 6 in the region of the cooling plates 13. As a result, the heat arising in these power components is dissipated along very short paths via the conductive track segments and the cooling plates 13 to the external cast housing. The heat transfer is further improved through sockets 36 which serve in the first place as reinforcing elements for the mounting bosses 18, but which also dissipate heat from the cooling plates 13 into fastening bolts (not illustrated here).

Figure 2:
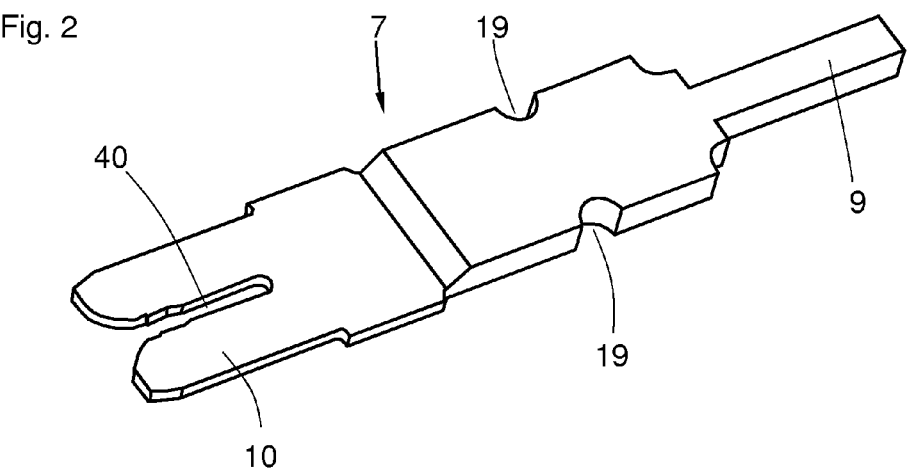
FIG. 2 shows a three-dimensional representation of a guide plate.

FIG. 2 shows a three-dimensional illustration of a guide plate 7, with the insulation displacement contact 10, the press-fit contact 9 and channels 19 which, after embedding in the thermosetting material of the housing component 8, enter into a positive-locking connection with it. The press-fit contact (contact region) exhibits a larger plate thickness, in order to achieve better bending stiffness. The insulation displacement contact 10 comprises a wire receptacle 40 to receive and contact a winding wire.

Figure 3:
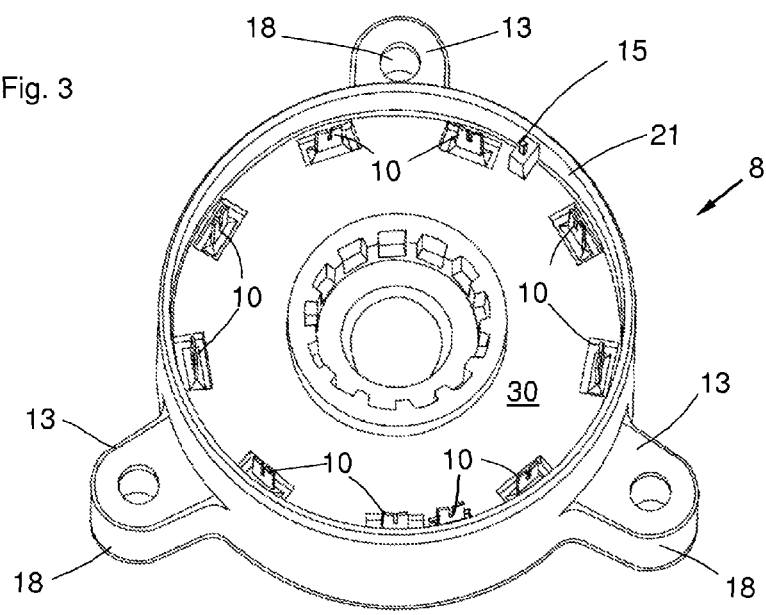
FIG. 3 shows a three-dimensional representation of a guide plate.

FIG. 3 shows a first view of the housing component 8, with the roller bearing 16, the insulation displacement contact 10, a ground contact 15, the hollow, cylindrical motor housing section 21, the wall 30, the mounting bosses 18 and the cooling plates 13. The motor side of the housing component 8 is shown. It can clearly be seen here that the cooling plates 13 form the bolting surfaces of the mounting bosses 18, in order to be able to dissipate the heat arising in the electronics quickly.

Figure 4:
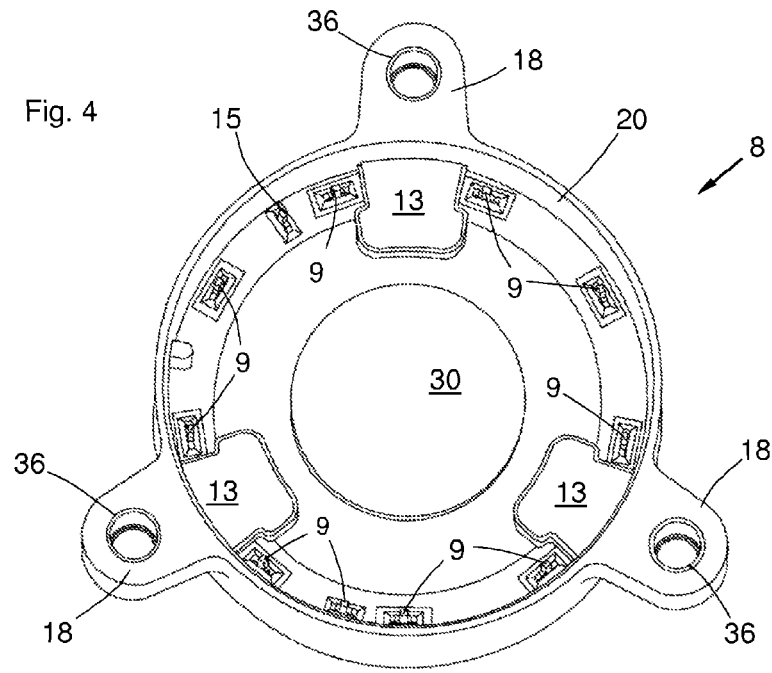
FIG. 4 shows a second view of the housing component.

FIG. 4 shows a second view of the housing component 8, with the press-fit contact 9, the ground contact 15, the hollow, cylindrical electronics housing section 20, the wall 30, the mounting bosses 18 and the cooling plates 13, which here in the internal region of the electronic housing lie open, in order to permit a direct contact with conductive track sections of the circuit board. The cooling plates 13 are preferably formed elastically in order to ensure reliable heat transfer.

Figure 5:
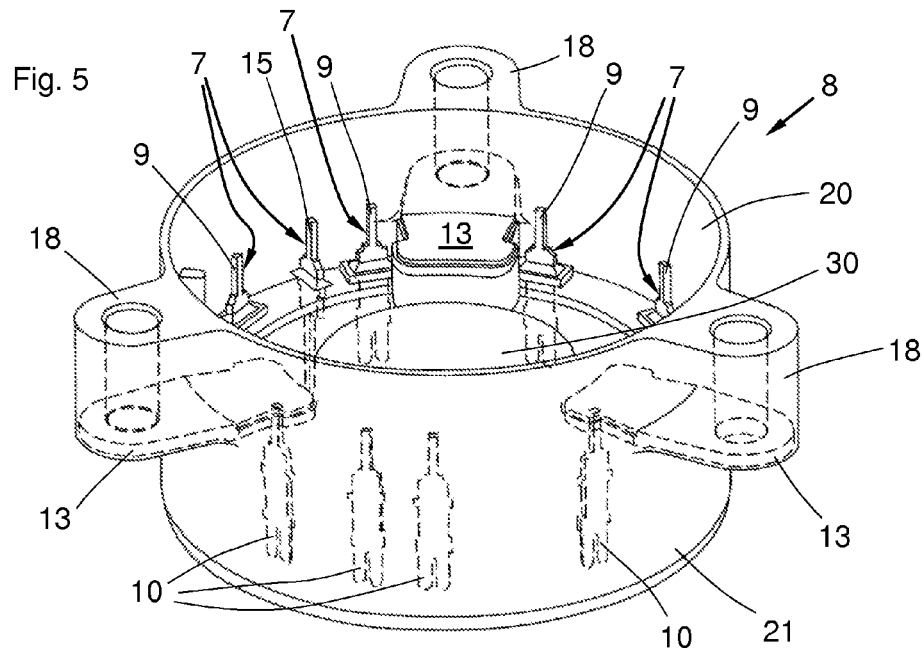
FIG. 5 shows a third, transparent view of the housing component.

FIG. 5 shows a third, transparent view of the housing component 8, with the hollow, cylindrical electronic housing section 20, the hollow, cylindrical motor housing section 21, the wall 30, the mounting bosses 18, the cooling plates 13 and the guide plates 7. The guide plates 7 are here formed as individual parts, each with a press-fit contact 9 and, at the other end, an insulation displacement contact 10. A plurality of insulation displacement contacts would also be possible as an alternative. Guide plates at the same potential can also be connected by conductive ties.

Figure 6:
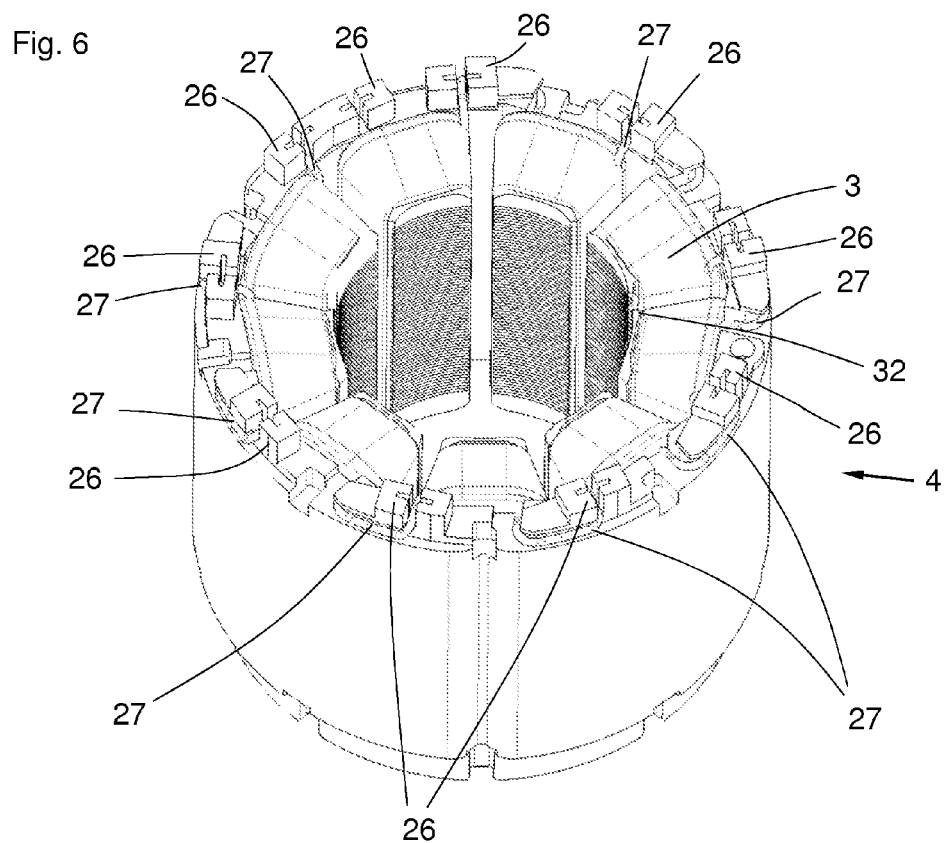
FIG. 6 shows a three-dimensional representation of a stator.

FIG. 6 shows a three-dimensional illustration of the stator 4, with the stator sheet package 31, the stator insulation 32, the stator winding 3, the winding wire 27 and receiving shafts 26 for holding the insulation displacement contacts. The winding wires 27 are laid radially in the contact region, whereas the insulation displacement contacts are aligned tangentially.

Figures 7, 8:
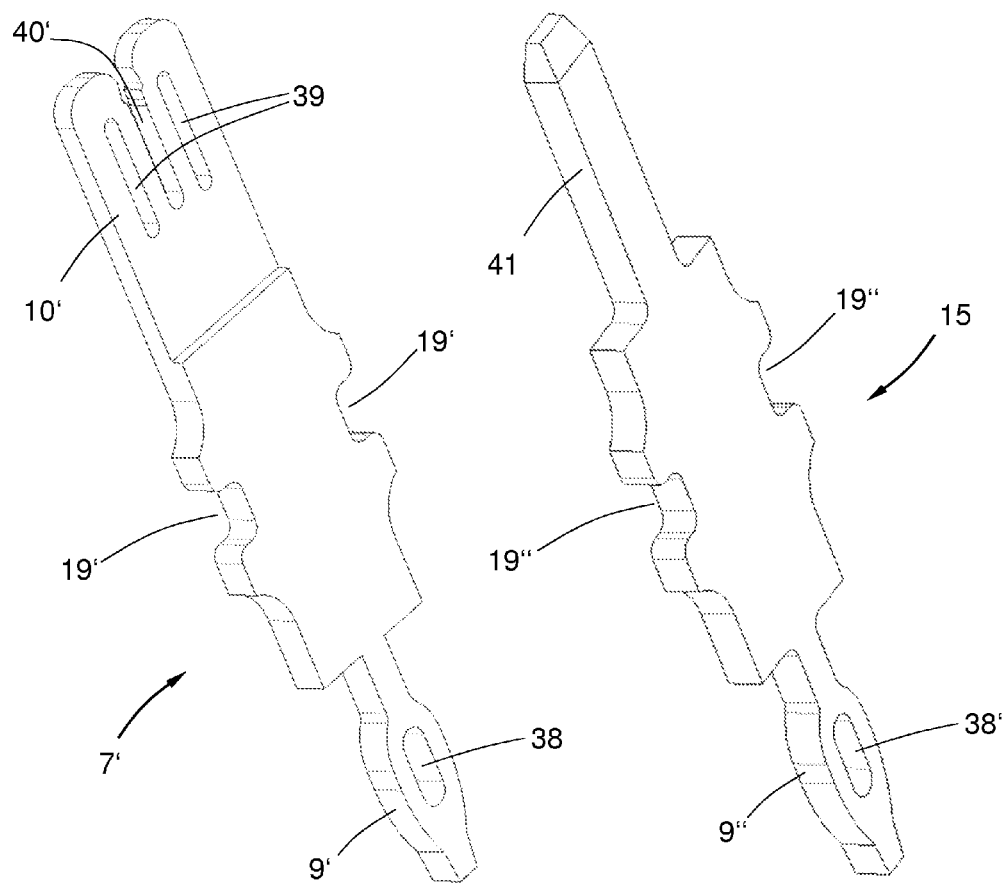
FIG. 7 shows a variant of FIG. 2.
FIG. 8 shows a ground contact.

FIG. 7 shows a three-dimensional variant of FIG. 2, with an insulation displacement contact 10', a press-fit contact 9' and channels 19' which, after embedding in the thermosetting material of the housing component 8 (FIG. 5), enter into a positive-locking connection with it. The press-fit contact 9' (contact region) exhibits a larger plate thickness, in order to achieve better bending stiffness. The insulation displacement contact 10' comprises a wire receptacle 40' to receive and contact a winding wire. A recess 38 in the press-fit contact 9' and slots 39 in the insulation displacement contact 10' are also present in this variant, in order to increase the elasticity of the respective region.

FIG. 8 shows the ground contact 15 (see also FIG. 3-5), which serves to create an electrical connection between the circuit board and the stator. The ground contact comprises a contact pin 41, channels 19" and a press-fit contact 9" with a recess 38'.

LIST OF REFERENCE SIGNS

1 DC motor
2 Motor axis
3 Stator winding
4 Stator
5 Permanent magnet rotor
6 Circuit board
7 Guide plate
8 Housing component
9 Press-fit contact
10 Insulation displacement contact
11 Motor compartment
12 Electronics compartment
13 Cooling plate
14 Housing cover
15 Ground contact
16 Roller bearing
17 Elastic means (on the cover)
18 Mounting bosses
19 Channel
20 Electronic housing section
21 Motor housing section
22 Motor housing
23 Bearing plate
24 Transducer magnet
25 Magnetic sensor
26 Receiving shaft
27 Winding wire
28 Bearing
29 Shaft
30 Wall
31 Stator sheet package
32 Stator insulation
33 Cover seal
34 Housing seal
35 Bearing plate seal
36 Bush
37 Power component
38 Recess
39 Slot
40 Wire receptacle
41 Contact pin

We claim:

1. An electronically commutated DC motor with a stator wound with a multi-phase stator winding, a permanent magnet rotor mounted rotatably about a motor axis, a circuit board, a plurality of guide plates electrically connected to the winding and a housing component, wherein:
   a majority of the guide plates comprise at least one press-fit contact for electrical connection to the circuit board and at least one insulation displacement contact for electrical connection to the winding;
   a central part of the guide plate between the insulation displacement contact and the press-fit contact in the housing component is cast or injection-molded to be oil-tight;
   the insulation displacement contacts extend parallel to the axis in an oil-filled or oil-fillable motor compartment; and
   the press-fit contacts extend parallel to the axis in a dry compartment in which the circuit board is arranged and the press-fit contacts are pressed into the circuit board.

2. The electronically commutated DC motor as recited in claim 1, wherein insulated vias of the circuit board:
   are joined thermally conductively with a cooling plate,
   or lie thermally conductively against a cooling plate.

3. The electronically commutated DC motor as recited in claim 2, wherein the cooling plate extends radially outwards in the region of mounting bosses.

4. The electronically commutated DC motor as recited in claim 2, wherein the circuit board:
   lies sprung against the cooling plate;
   or is pressed onto it.

5. The electronically commutated DC motor as recited in claim 4, wherein the dry compartment is closed by a housing cover on which at least one elastic means is arranged to press the circuit board onto the cooling plate.

6. The electronically commutated DC motor as recited in claim 5, wherein the elastic means consists of a rubber-like material, in particular a silicone material.

7. The electronically commutated DC motor as recited in claim 1, wherein:
   the guide plate consists of a plurality of insulation displacement contacts which are joined into one piece by at least one metal bridge; and
   the metal bridge is injected or cast into the housing component.

8. The electronically commutated DC motor as recited in claim 1, wherein a plurality of mutually electrically isolated guide plates is provided.

9. The electronically commutated DC motor as recited in claim 1, wherein one guide plate acts as a neutral point terminal and the other guide plates as phase terminals.

10. The electronically commutated DC motor according as recited in claim 1, wherein the insulation displacement contacts and/or the press-fit contacts are constructed in the form of double contacts.

11. The electronically commutated DC motor as recited in claim 1, wherein the windings are connected together with:
the aid of the guide plates; or
the aid of conductive tracks of the circuit board.

12. The electronically commutated DC motor as recited in claim 1, wherein connecting contacts are injected or cast into the housing component, extending at one end outwards outside the housing component and at the other end forming press-fit contacts that are aligned parallel to the press-fit contacts and are arranged in the same plane.

13. The electronically commutated DC motor as recited in claim 1, wherein the housing component consists of a thermosetting material that can be processed using injection-molding technology.

14. The electronically commutated DC motor as recited in claim 1, wherein the circuit board is embedded into a sealing material.

15. The electronically commutated DC motor as recited in claim 13, wherein the circuit board is embedded into the thermosetting material of the housing component.

16. The DC motor as recited in claim 1, wherein the housing cover is connected to the housing component by snap-fastening elements.

17. A method of manufacturing the electronically commutated DC motor as recited in claim 1, wherein the circuit board is arranged at right angles to the motor axis, and wherein the method comprises the following process steps:
a) providing a previously-fabricated housing component with injected guide plates and cooling plates, a populated circuit board, a cover seal and a housing cover;
b) pressing the circuit board into the press-fit contacts of the housing component;
c) mounting the housing cover provided with the cover seal onto the housing component thereby fabricating an electronic module;
d) testing the electronic module;
e) providing a pre-assembled DC motor;
f) mounting the electronic module onto the prefabricated DC motor and thereby contacting the winding wire of the stator winding.

18. An electronically commutated DC motor with a stator wound with a multi-phase stator winding, a permanent magnet rotor mounted rotatably about a motor axis, a circuit board, a plurality of guide plates electrically connected to the winding and a housing component, wherein:
a majority of the guide plates comprise at least one press-fit contact for electrical connection to the circuit board and at least one insulation displacement contact for electrical connection to the winding;
a central part of the guide plate between the insulation displacement contact and the press-fit contact in the housing component is cast or injection-molded to be oil-tight;
the insulation displacement contacts extend parallel to the axis in an oil-filled or oil-fillable motor compartment; and
the press-fit contacts extend parallel to the axis in a dry compartment in which the circuit board is arranged and the press-fit contacts are pressed into the circuit board;
wherein the housing component is a bearing plate in which, in the fully assembled state, a roller bearing is held whose outer ring forms a sliding seat with the receptacle of the housing component.

19. The electronically commutated DC motor as recited in claim 18, wherein insulated vias of the circuit board:
are joined thermally conductively with a cooling plate,
or lie thermally conductively against a cooling plate.

20. The electronically commutated DC motor as recited in claim 19, wherein the cooling plate extends radially outwards in the region of mounting bosses.

21. The electronically commutated DC motor as recited in claim 19, wherein the circuit board:
lies sprung against the cooling plate;
or is pressed onto it.

22. The electronically commutated DC motor as recited in claim 21, wherein the dry compartment is closed by a housing cover on which at least one elastic means is arranged to press the circuit board onto the cooling plate.

23. The electronically commutated DC motor as recited in claim 22, wherein the elastic means consists of a rubber-like material, in particular a silicone material.

24. The electronically commutated DC motor as recited in claim 18, wherein: the guide plate consists of a plurality of insulation displacement contacts
which are joined into one piece by at least one metal bridge; and
the metal bridge is injected or cast into the housing component.

25. The electronically commutated DC motor as recited in claim 18, wherein a plurality of mutually electrically isolated guide plates is provided.

26. The electronically commutated DC motor as recited in claim 18, wherein one guide plate acts as a neutral point terminal and the other guide plates as phase terminals.

27. The electronically commutated DC motor according as recited in claim 18, wherein the insulation displacement contacts and/or the press-fit contacts are constructed in the form of double contacts.

28. The electronically commutated DC motor as recited in claim 18, wherein the windings are connected together with:
the aid of the guide plates; or
the aid of conductive tracks of the circuit board.

29. The electronically commutated DC motor as recited in claim 18, wherein connecting contacts are injected or cast into the housing component, extending at one end outwards outside the housing component and at the other end forming press-fit contacts that are aligned parallel to the press-fit contacts and are arranged in the same plane.

30. The electronically commutated DC motor as recited in claim 18, wherein the housing component consists of a thermosetting material that can be processed using injection-molding technology.

31. The electronically commutated DC motor as recited in claim 18, wherein the circuit board is embedded into a sealing material.

32. The electronically commutated DC motor as recited in claim 31, wherein the circuit board is embedded into the thermosetting material of the housing component.

33. The DC motor as recited in claim 18, wherein the housing cover is connected to the housing component by snap-fastening elements.

* * * * *